US009369170B2

(12) United States Patent
    Sorrentino

(10) Patent No.: US 9,369,170 B2
(45) Date of Patent: Jun. 14, 2016

(54) MOBILE DEVICE CASE WITH MOVABLE CAMERA COVER

(71) Applicant: Michael Sorrentino, New York, NY (US)

(72) Inventor: Michael Sorrentino, New York, NY (US)

( * ) Notice: Subject to any disclaimer, the term of this patent is extended or adjusted under 35 U.S.C. 154(b) by 0 days.

(21) Appl. No.: 14/638,450

(22) Filed: Mar. 4, 2015

(65) Prior Publication Data

US 2015/0311941 A1    Oct. 29, 2015

Related U.S. Application Data

(63) Continuation of application No. 29/483,897, filed on Apr. 3, 2014.

(60) Provisional application No. 61/947,970, filed on Mar. 4, 2014, provisional application No. 61/974,952, filed on Apr. 3, 2014.

(51) Int. Cl.
    *H04B 1/3888*    (2015.01)
    *H04M 1/18*      (2006.01)
    *H04M 1/02*      (2006.01)

(52) U.S. Cl.
    CPC ............. *H04B 1/3888* (2013.01); *H04M 1/185* (2013.01); *H04M 1/0264* (2013.01)

(58) Field of Classification Search
    CPC .. H04B 1/38888; H04B 1/3888; H04M 1/185
    USPC ............................................ 455/575.8, 575.1
    See application file for complete search history.

(56) References Cited

U.S. PATENT DOCUMENTS

| 7,581,893 | B2 * | 9/2009  | Miramontes ........ H04M 1/0264 396/448 |
| 7,639,294 | B2 * | 12/2009 | Ito ......................... H04N 5/2254 348/221.1 |
| 7,917,168 | B2 * | 3/2011  | Silverbrook ............... B41J 2/01 358/473 |
| 8,177,440 | B2 * | 5/2012  | Olsson ..................... H01H 3/20 396/448 |
| 8,579,172 | B2 * | 11/2013 | Monaco ................... H04M 1/15 224/191 |
| 8,764,319 | B2 * | 7/2014  | Oh ........................ G03B 11/041 396/448 |
| 8,797,453 | B2 * | 8/2014  | Pavithran ............. H04N 5/2254 348/335 |
| 8,810,638 | B2 * | 8/2014  | Allen ................. A61B 1/00183 348/65 |
| 8,955,678 | B2 * | 2/2015  | Murphy .................. B23P 19/00 206/320 |

(Continued)

FOREIGN PATENT DOCUMENTS

| CN | 102364375 B    | 2/2012 |
| DE | 202005004366 U1 | 6/2005 |
| KR | 20060022640 A  | 3/2006 |

*Primary Examiner* — Hai V Nguyen
(74) *Attorney, Agent, or Firm* — Troutman Sanders LLP

(57) ABSTRACT

A protective case for a mobile device has a body removably disposed on the mobile device and a movable lens cover disposed on the body proximate to the first camera lens. The movable lens cover includes a first lens occlusion section and a first sensor access section. The movable lens cover can have at least two positions in relation to the mobile device. A fully exposed position exposes both the first camera lens and the at least one sensor of the mobile device, and a first partially occluded position disposes the first lens occlusion section over the first camera lens preventing light from reaching the first camera lens and disposes the first sensor access section over the at least one sensor allowing the at least one sensor to receive the input.

17 Claims, 16 Drawing Sheets

(56) References Cited

U.S. PATENT DOCUMENTS

| | | | | |
|---|---|---|---|---|
| 8,973,752 B2* | 3/2015 | Johnson | | H04B 1/3888 206/316.1 |
| 9,042,967 B2* | 5/2015 | Dacosta | | A61B 5/0059 600/476 |
| 9,069,083 B2* | 6/2015 | Goldstein | | G01T 1/20 |
| 9,124,792 B2 | 9/2015 | Barangan et al. | | |
| 9,245,514 B2* | 1/2016 | Donaldson | | G10K 11/16 |
| 2005/0288075 A1* | 12/2005 | Geernaert | | H04M 1/021 455/575.4 |
| 2007/0098384 A1* | 5/2007 | Wakamizu | | G03B 17/04 396/56 |
| 2007/0212059 A1* | 9/2007 | Kim | | G03B 29/00 396/448 |
| 2008/0170844 A1 | 7/2008 | Samuel | | |
| 2009/0166511 A1* | 7/2009 | Kwon | | G01J 1/02 250/206 |
| 2009/0291708 A1* | 11/2009 | Silverbrook | | B41J 2/01 455/556.1 |
| 2010/0247091 A1* | 9/2010 | Olsson | | H01H 3/20 396/448 |
| 2011/0081946 A1* | 4/2011 | Singh | | H04M 1/0264 455/556.1 |
| 2011/0134303 A1* | 6/2011 | Jung | | H01L 27/14618 348/340 |
| 2011/0181740 A1* | 7/2011 | Watanabe | | G03B 3/10 348/208.2 |
| 2011/0188176 A1* | 8/2011 | Kim | | H05K 7/00 361/679.01 |
| 2012/0074006 A1* | 3/2012 | Monaco | | H04M 1/15 206/320 |
| 2012/0092543 A1* | 4/2012 | Afshari | | H04N 5/2254 348/335 |
| 2012/0270600 A1* | 10/2012 | Zelson | | H04B 1/3888 455/556.1 |
| 2013/0314810 A1* | 11/2013 | Sekimoto | | G02B 7/021 359/823 |
| 2013/0316690 A1* | 11/2013 | Wildner | | H04W 8/22 455/418 |
| 2014/0057687 A1* | 2/2014 | Yoo | | H04B 1/3888 455/575.8 |
| 2014/0119718 A1* | 5/2014 | Oh | | G03B 11/041 396/448 |
| 2014/0132932 A1* | 5/2014 | Jung | | A61B 3/1173 351/221 |
| 2014/0158769 A1* | 6/2014 | Powell | | G06K 7/10811 235/462.06 |
| 2014/0184881 A1* | 7/2014 | McKinley | | H04N 5/2253 348/345 |
| 2014/0226062 A1* | 8/2014 | Parrill | | H04N 5/2252 348/376 |
| 2014/0296403 A1* | 10/2014 | Ota | | C08L 67/02 524/186 |
| 2014/0347814 A1* | 11/2014 | Zaloom | | G06F 1/1626 361/679.56 |
| 2014/0364168 A1* | 12/2014 | Galuszka | | H04M 1/0264 455/556.1 |
| 2015/0141096 A1* | 5/2015 | Murphy | | B23P 19/00 455/575.8 |
| 2015/0158324 A1* | 6/2015 | Cooper | | B42F 9/002 281/45 |
| 2015/0163385 A1 | 6/2015 | Haddad | | |
| 2015/0172538 A1* | 6/2015 | Nordstrom | | H04N 5/2252 348/207.1 |
| 2015/0303967 A1* | 10/2015 | Igarashi | | H04M 1/04 455/575.8 |
| 2015/0334657 A1* | 11/2015 | Newham | | H04W 4/008 455/41.2 |
| 2016/0033194 A1* | 2/2016 | Sumihiro | | F25D 23/04 62/125 |
| 2016/0049979 A1* | 2/2016 | Grouwstra | | H04B 1/3888 455/575.8 |
| 2016/0092711 A1* | 3/2016 | Powell | | G06K 7/10811 235/462.06 |

* cited by examiner

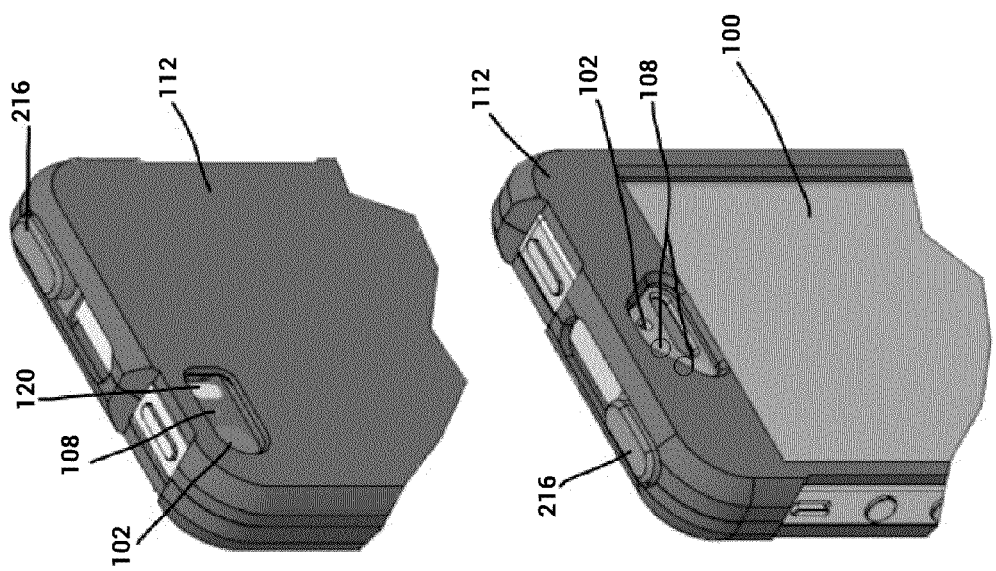

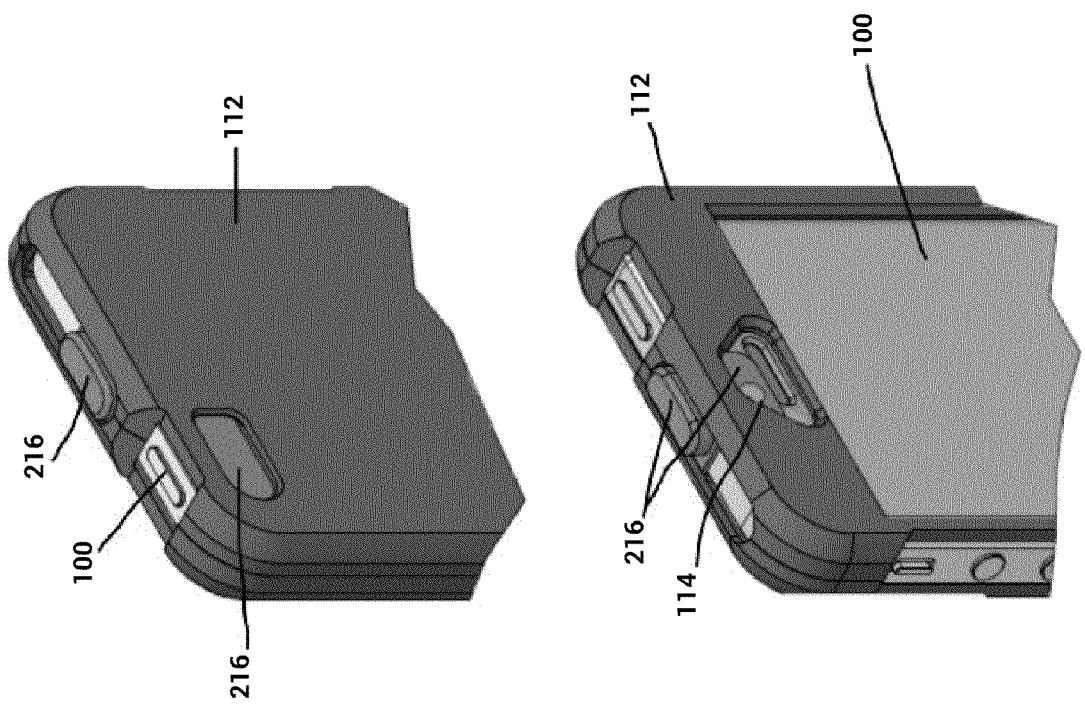

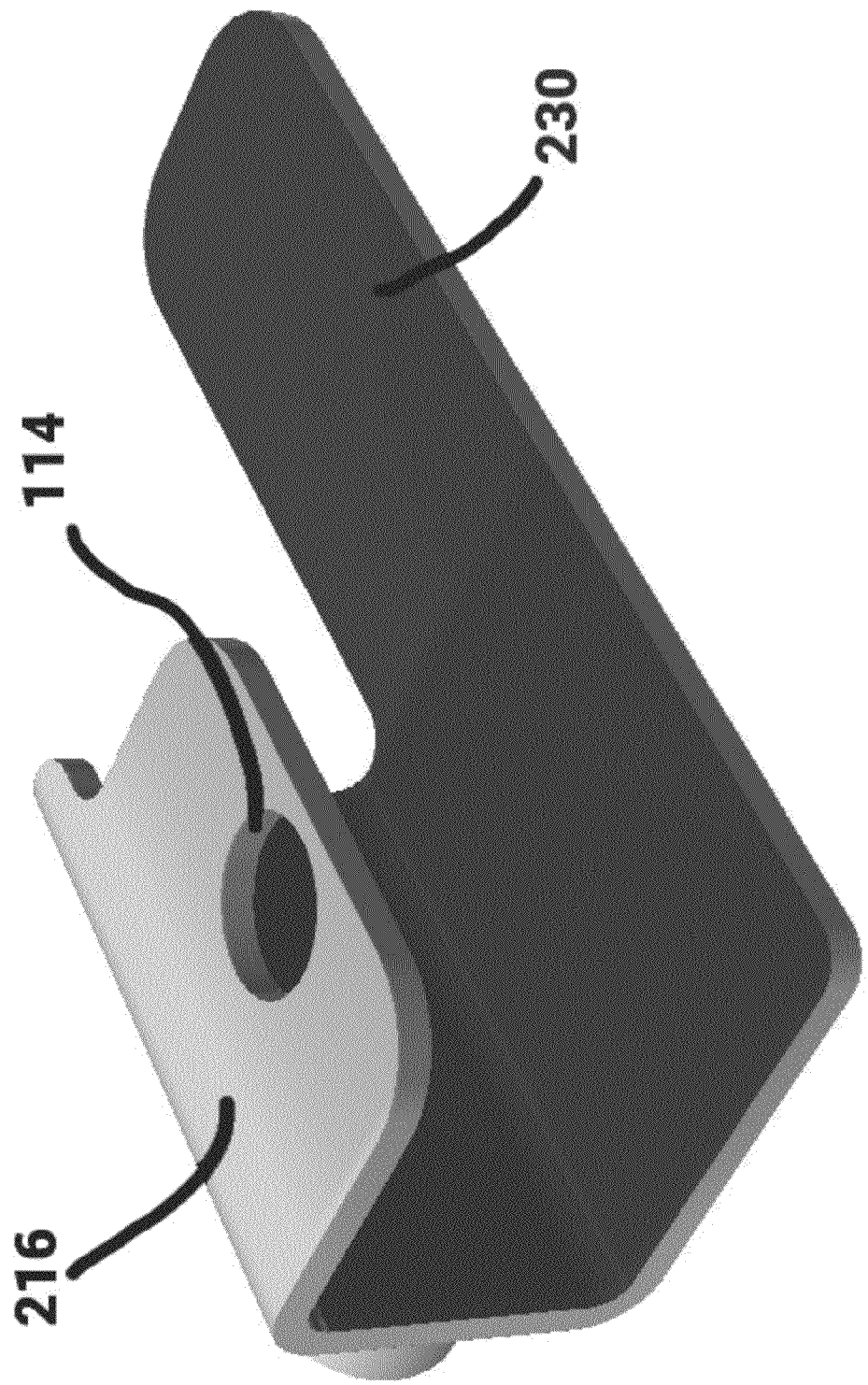

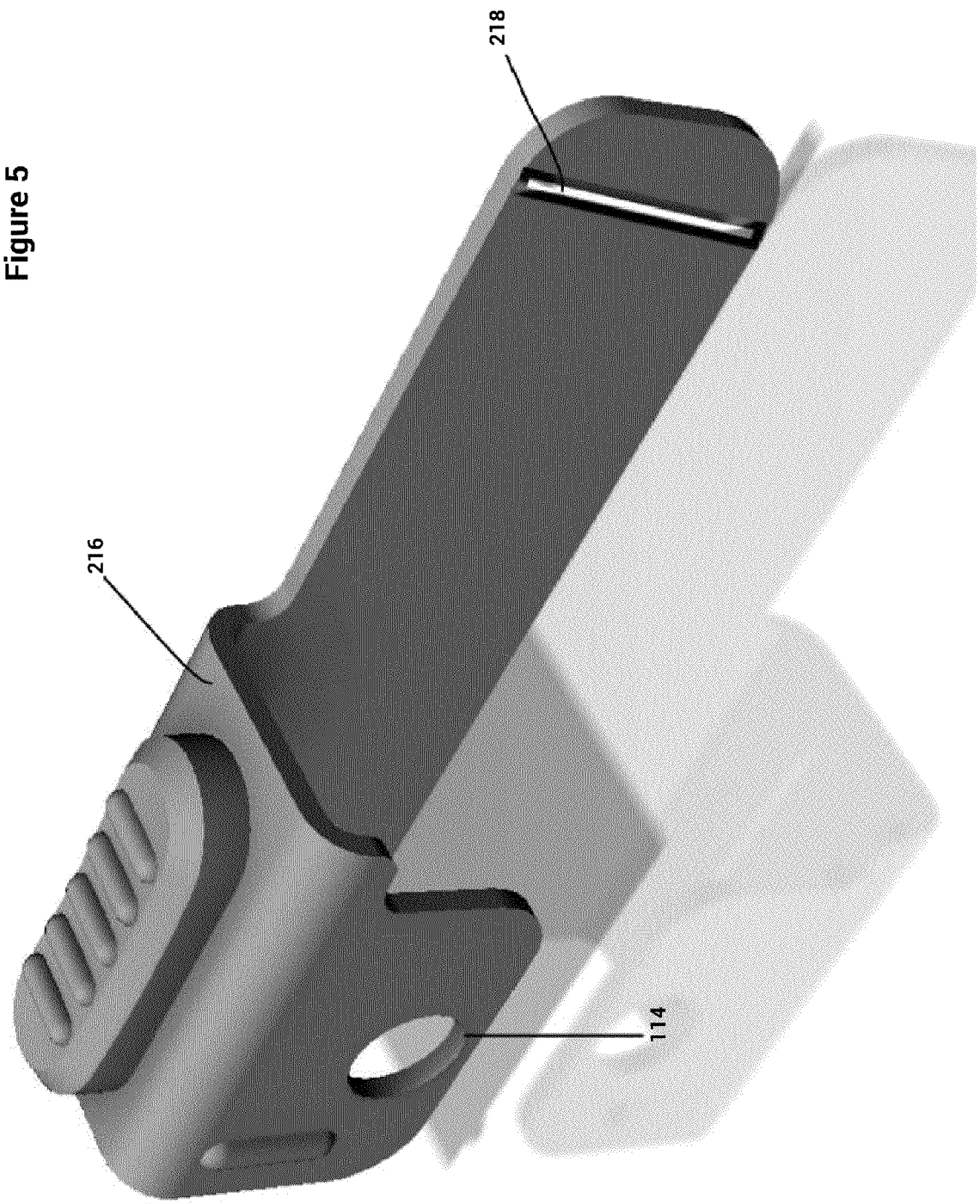

Fig. 7A
Fig. 7B
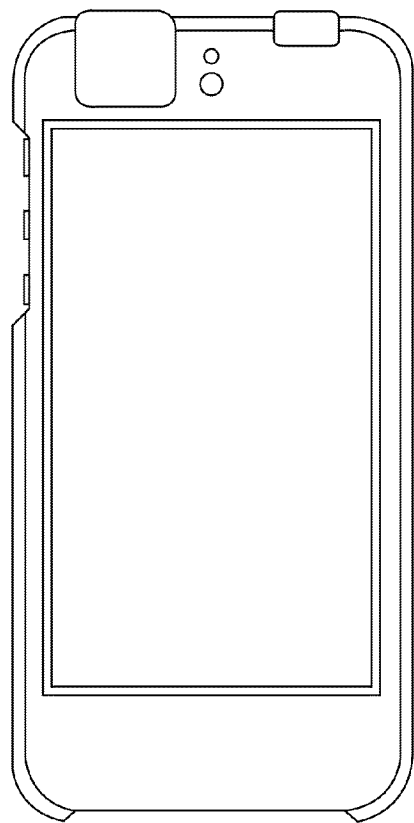
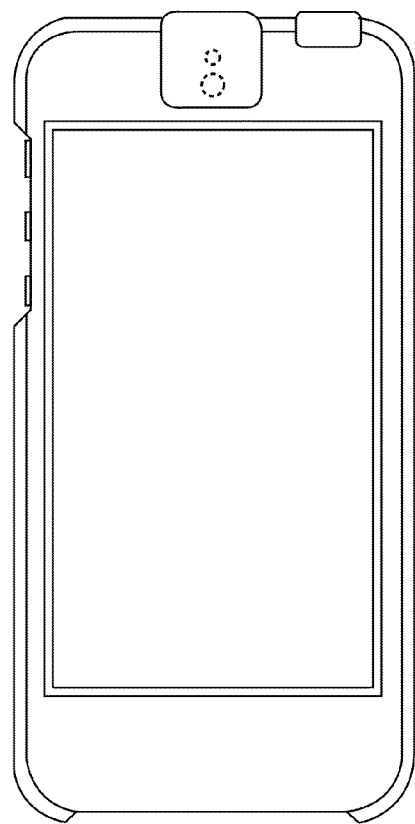

Fig. 8A
Fig. 8B
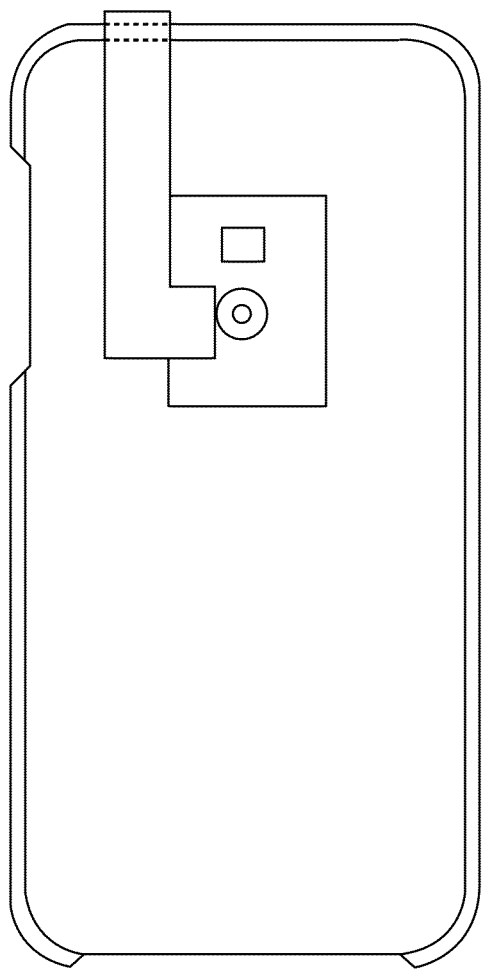
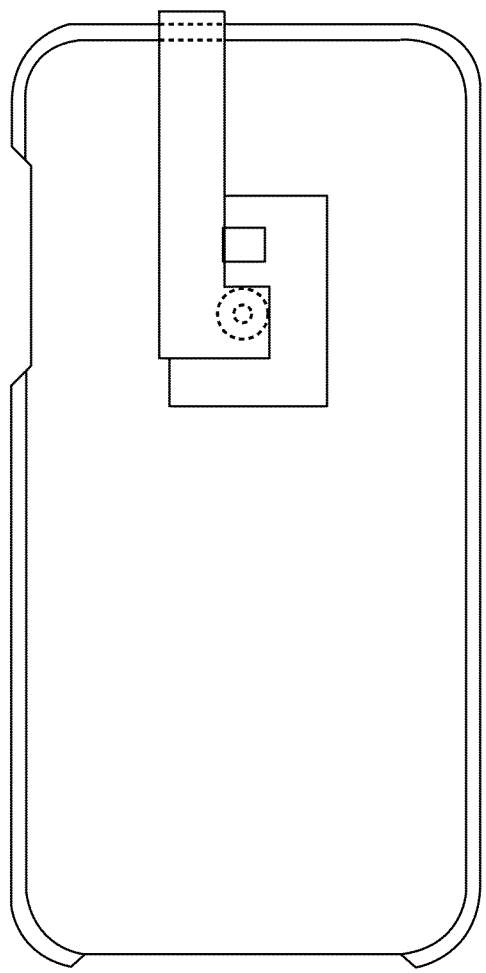

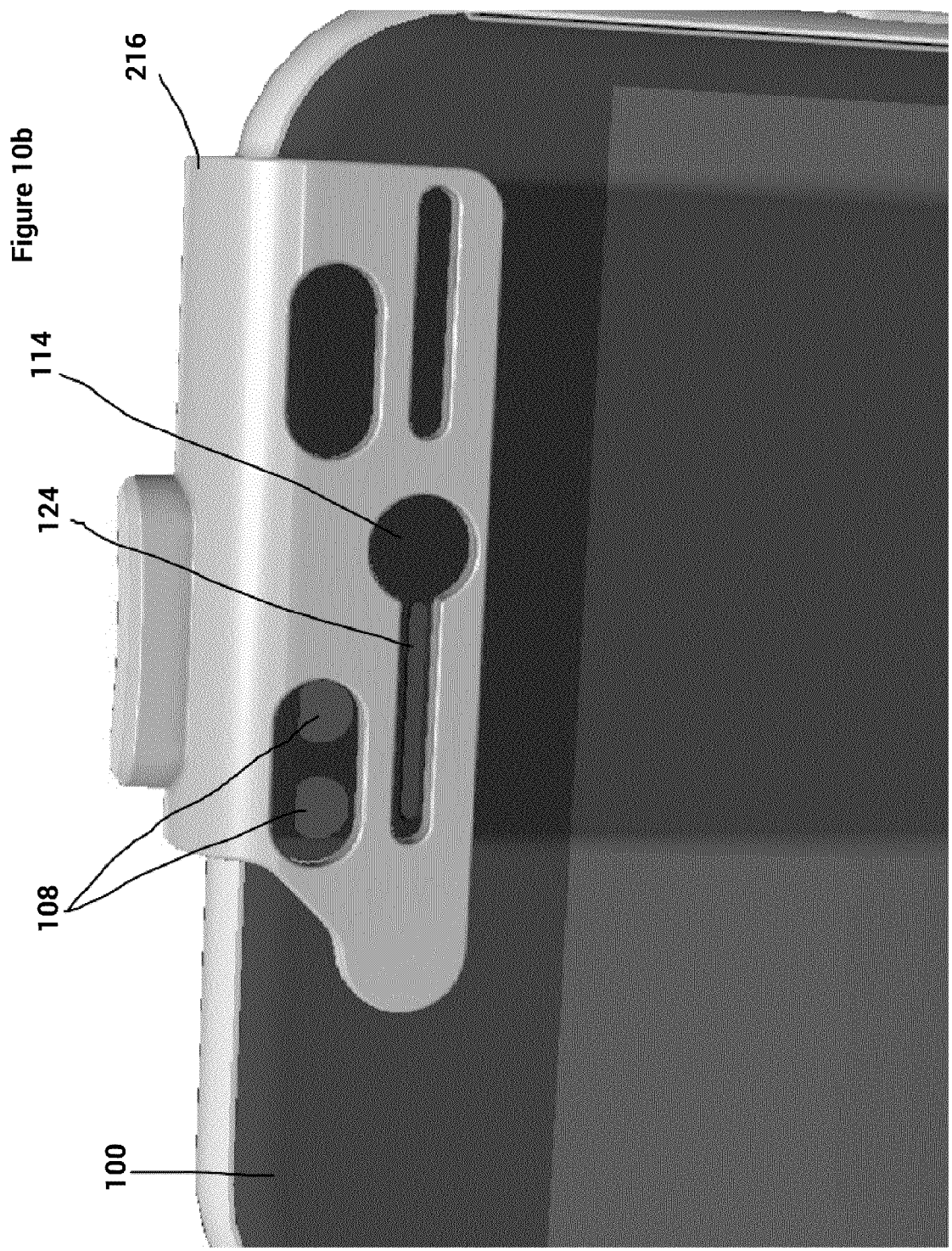

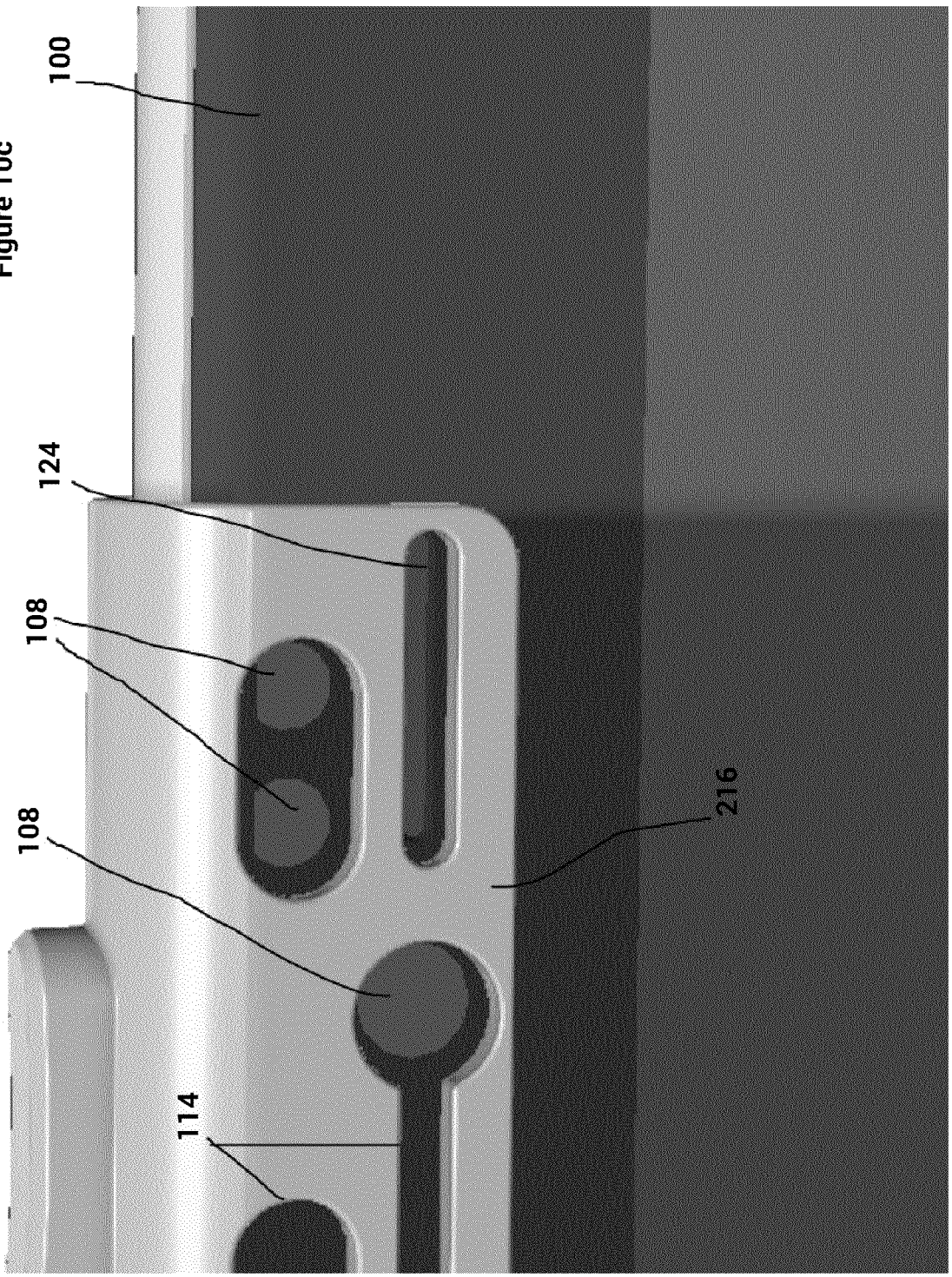

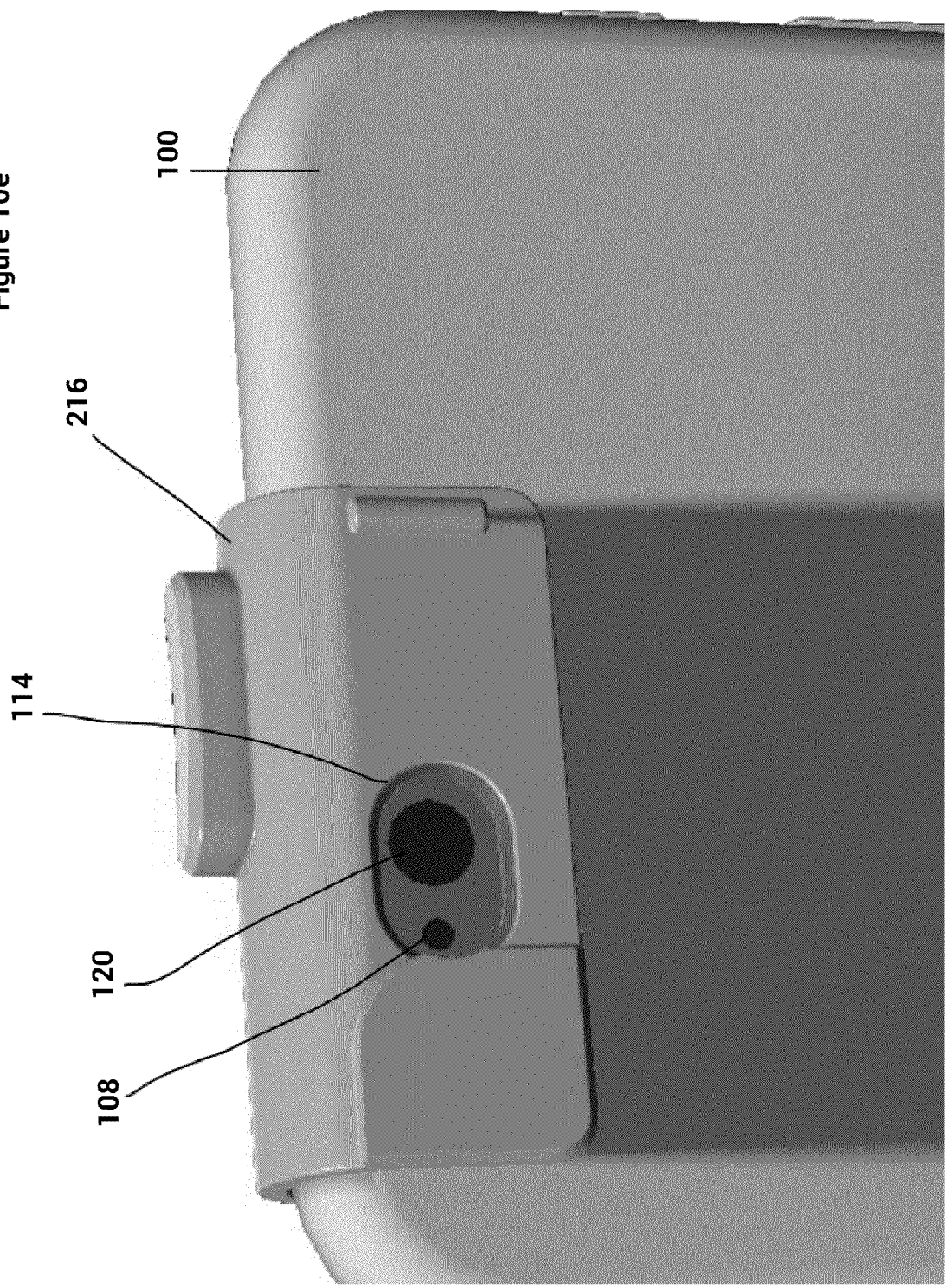

MOBILE DEVICE CASE WITH MOVABLE CAMERA COVER

CROSS-REFERENCE TO RELATED APPLICATIONS

This application claims priority to Provisional Application Ser. No. 61/947,970, filed Mar. 4, 2014 and further claims priority to Provisional Application Ser. No. 61/974,952, filed Apr. 3, 2014 and is a Continuation of Design Application Serial No. 29/483,897, filed Apr. 3, 2014. All of the applications are incorporated by reference herein in their entirety.

FIELD OF INVENTION

The present invention relates to mobile device cases and selectively occluding the lenses thereon.

BACKGROUND

Regular mobile device cases leave the camera exposed at all times. Prior art devices keep the camera lens covered until the user wants to expose it for use along with the sensors. When the camera cover is in the closed position, light and other inputs are prevented from getting to the cameras image sensor. Prior art covers obstruct the device's other sensors (such as the proximity or ambient light sensors) and in some cases, the flash.

Prior art camera lens covers for cell-phone case include U.S. Pat. No. 8,764,319. The '319 patent is specifically for cell-phones, it does not apply to tablet computers, laptops, or other mobile devices. The detachable camera cover plugs into the devices earphone jack but does not leave openings for the other sensors on the device (such as the proximity and light sensors).

U.S. Pat. No. 7,581,893 is, again, specifically for cell-phones, it does not apply to tablet computers, laptops, or other mobile devices. The '893 patent requires a specific shape of the lens covers. Further, this activates the camera when exposed, requiring interaction with the devices software and hardware.

U.S. Patent Publication No. 2007/0212059 and Korean Patent Application No. 2006-0022640 both are directed to a lens protecting apparatus for cellular phone camera. They are specifically for cell-phones, it does not apply to tablet computers, laptops, or other mobile devices. Both require electricity in order to operate and interaction with the devices software and hardware.

German Utility Model No. DE202005004366 is a leaning pad for mobile telephone or a digital camera. The lens is cleaned by a non-abrasive woven cloth backed by a pad but it needs to be tied to the device with a piece of yarn.

Chinese Patent No CN 102364375 is a standalone lens cleaning cap for mobile cameras. However, it does not leave openings for the other sensors on the device, such as the proximity and light sensors.

U.S. Patent Publication No. 2008/0170844 is directed to a camera wiper. However, this invention is specifically a watertight housing for a camera, it does not occlude the camera's lens for protection.

Thus, there is a need in the art for a camera cover for electronic devices that can occlude the lens itself but leave the remaining sensors unobstructed to retain the full functionality of the electronic device.

SUMMARY

An example of a protective case for a mobile device has a front face, a rear face, a top edge, a bottom edge, two side edges, a first camera lens, and at least one sensor receiving an input. The protective case can include a body removably disposed on the mobile device and covering at least a portion of at least one of the front face, the rear face, the top, bottom and two side edges of the mobile device and a movable lens cover disposed on the body proximate to the first camera lens. The movable lens cover includes a first lens occlusion section and a first sensor access section. The movable lens cover can have at least two positions in relation to the mobile device. A fully exposed position exposes both the first camera lens and the at least one sensor, and a first partially occluded position disposes the first lens occlusion section over the first camera lens preventing light from reaching the first camera lens and disposes the first sensor access section over the at least one sensor allowing the at least one sensor to receive the input.

Another example of the protective case has the mobile device with a second camera lens and at least one second sensor proximate the second camera lens. The movable lens cover can further include a second lens occlusion section and a second sensor access section. Then, the fully exposed position further exposes the second camera lens and the at least one second sensor, and the first partially occluded position further disposes the second lens occlusion section over the second camera lens preventing light from reaching the second camera lens and disposes the second sensor access section over the at least one second sensor allowing the sensor to receive inputs.

A further example to the above has a second partially occluded position disposing the second lens occlusion section over the second camera lens preventing light from reaching the second camera lens and disposing the second sensor access section over the at least one second sensor allowing the sensor to receive inputs. In this example, the second partially occluded position exposes both the first camera lens and the at least one sensor.

Additionally, the movable lens cover can have a third partially occluded position, fully occluding the first and second camera lens, and exposing the at least one sensor and the at least one second sensor. This can be by disposing the first lens occlusion section over the first camera lens preventing light from reaching the first camera lens and the second lens occlusion section over the second camera lens preventing light from reaching the second camera lens. Then disposing the first sensor access section over the at least one sensor allowing the sensor to receive inputs and the second sensor access section over the at least one second sensor allowing the least one second sensor to receive inputs.

The movable lens cover can also have a fully occluded position, fully occluding the first camera lens, the second camera lens, the at least one sensor and the at least one second sensor for any of the above examples.

The protective case can have a camera-exposing cutout provided at an edge of the body exposing at least the first camera lens of the mobile device, and then the first partially occluded position disposes the movable lens cover over at least a portion of the camera-exposing cutout. Also, include can be a second camera-exposing cutout provided at an edge of the body exposing at least the second camera lens of the mobile device. Then the first partially occluded position can dispose the movable lens cover over at least a portion of the first and the second camera-exposing cutouts.

The movable lens cover of the protective case, in an example, can have a first lens cleaner disposed on the first lens occlusion section wiping the first camera lens when the first lens occlusion section is disposed over the first camera lens. The movable lens cover, in a further example, has a second lens cleaner disposed on the second lens occlusion section wiping the second camera lens when the second lens occlusion section is disposed over the second camera lens.

Another example of a movable lens cover is for a mobile device having a body, a first camera lens, and at least one sensor receiving an input, which in some examples is a tablet or laptop. The movable lens cover has a movable lens cover disposing section to movably and removably dispose the movable lens cover on the body proximate to the first camera lens, a first lens occlusion section, and a first sensor access section. The movable lens cover has at least two positions in relation to the mobile device, a fully exposed position exposes both the first camera lens and the at least one sensor, and a first partially occluded position disposes the first lens occlusion section over the first camera lens preventing light from reaching the first camera lens and disposes the first sensor access section over the at least one sensor allowing the at least one sensor to receive the input.

As above, the movable lens cover has a fully occluded position, fully occluding the first camera lens, and the at least one sensor. Additional examples have a first lens cleaner disposed on the first lens occlusion section wiping the first camera lens when the first lens occlusion section is disposed over the first camera lens.

BRIEF DESCRIPTION OF THE DRAWINGS

The above and further aspects of this invention are further discussed with reference to the following description in conjunction with the accompanying drawings, in which like numerals indicate like structural elements and features in various figures. The drawings are not necessarily to scale, emphasis instead being placed upon illustrating principles of the invention. The figures depict one or more implementations of the inventive devices, by way of example only, not by way of limitation.

FIG. 2 illustrates a front and rear perspective views, in close-up, of an example of the mobile device case with the movable camera cover in the open position. The camera cover is open in this drawing. The top of the drawing shows the devices rear camera. The top of the drawing shows the devices front-facing camera. When open, the cover exposes the camera so that the cameras image sensor can take photos. The alternate sensors on the device remain exposed.

FIG. 3 illustrates a front and rear perspective views, in close-up, of a mobile device case with the movable camera cover in the closed position. The camera cover is closed in this drawing. The top of the drawing shows the devices rear camera. The top of the drawing shows the devices front-facing camera. When closed, the cover completely covers the cameras image sensor so that it cannot capture images other than the back of the cover. All the camera will see is black because the mobile device privacy case prevents light from getting to the cameras sensor. The alternate sensors on the device remain exposed.

FIG. 4 illustrates a bottom left side prospective view of an example of the interior of the camera cover that makes contact with the device camera lens. In this instance, the shaded area is coated with a fabric material that can clean the lens of the camera.

FIG. 5 illustrates a top, right, prospective view of an example of the interior of the camera cover that makes contact with the devices camera. In this instance, a flexible material such as rubber is molded onto the cover. This operates similar to a car's windshield wiper to clean debris from the camera's lens.

FIGS. 7A, 7B, 8A, and 8B illustrate an example of the case as a 3-piece unit. FIGS. 7A and 8A illustrate the invention in the "open" position, for the front and rear cameras, respectively. FIGS. 7B and 8B illustrate the invention in the "closed" position, for the front and rear cameras, respectively. The exterior is a protective material, such as rubber, to provide protection to the device. In this instance, the camera cover apparatus is comprised of 2 pieces—one cover for the front camera, another for the rear camera. One camera is located near the top-center of the front of the device, the second is located closer the middle-center of the devices back side. The camera cover apparatus is comprised of a single unit that can cover two cameras (front and rear) when the user slides it into the "on" position.

FIG. 9B is the magnified view of the cover in both the "open" and "closed" position.

FIGS. 10A-10E illustrate from and rear views of an example of the movable camera cover for a mobile phone. The cover has openings for the camera, the sensors, the phone speaker, and the flash on both the front and rear of the device. When in the open position, the camera, sensors, speaker, and flash are not occluded. When in the closed position, the camera is completely occluded, but the remaining elements are not.

DETAILED DESCRIPTION

Figure 1:
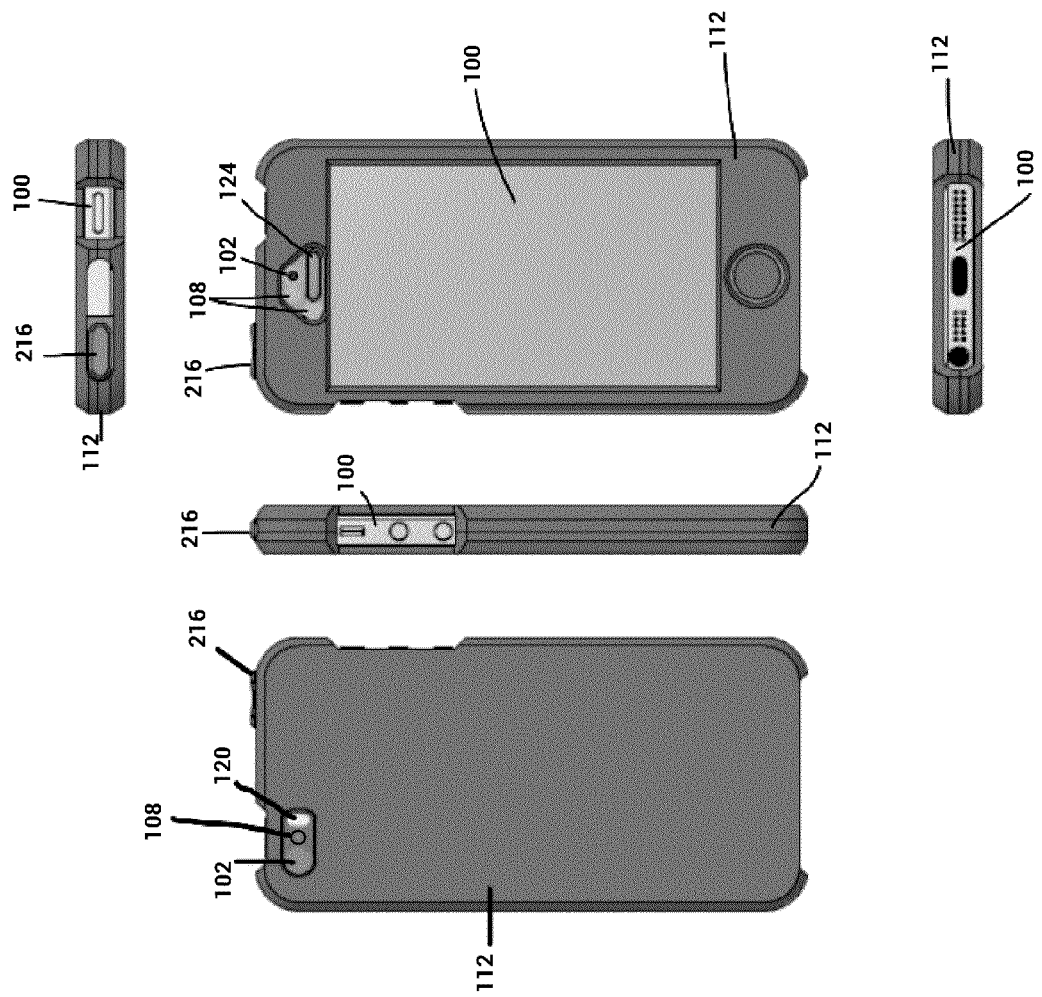
FIG. 1 illustrates a rear, front, top, bottom and left side view of an example of a case of the present invention when fully assembled and put onto the mobile device. The movable camera cover is in the open position. When open, the cover exposes the camera so that the cameras image sensor can take photos. The alternate sensors on the device remain exposed.

A mobile device 100 has a front face, and a rear face. Some mobile devices 100 have a camera 102, a lens 104, sensors 108, a microphone 122, a speaker 124, and a flash 120. A speaker 124 is an output device which allows the mobile device 100 to create sound. For example, a phone (not illustrated) may have a speaker 124 for the user to hear phone calls. A microphone 122 is an input device which allows the mobile device 100 to capture sound. For example, a phone (not illustrated) may have a microphone 122 for the user to speak into when making a phone call. A camera 102 requires a lens 104 to capture images.

Mobile devices 100 as used herein can be any device that a user caries on their person or is readily transportable. These include cellular telephones, smart phones, tablet computers, laptops, personal digital assistants (PDAs), smart watches, smart glasses, or any other device that may have a camera lens.

Mobile devices 100 often require the use of sensors 108. Sensors 108 translate information from the physical environment into electronic data (not illustrated). This data is used by the devices' 100 software (not illustrated). For example, a tablet computer (not illustrated) may have a light sensor 109 next to the camera 102. This allows the device 100 to take images with the proper exposure. Many other types of sensors 108 exist that detect sound, light, proximity, gravity, weight, electrical current, taste, odor, temperature, and many other environmental characteristics. A flash 120 is a light emitting apparatus which can increase brightness for photos. Some mobile devices 100 allow the user to keep the flash 120 always on, like a flash light, to see in dark spaces.

The present examples of the invention relates to mobile devices 100 that have one or more cameras 102. A case 110 is comprised of a body 112, which is a protective material that covers part or all of a mobile device 100. The body 112 leaves the camera 102 exposed. The body 112 can be made of a variety of materials including, but not limited to, rubber, plastic, or fabric. The body 112 can be made of more than one piece. For example, a hard plastic body 112 may have front and rear pieces which snap together. The body 112 may also be made of one piece of flexible material (rubber, for example), which stretches around the mobile device 100 and fits tightly around it to protect key parts of the mobile device 100.

An example of the invention has a case 110, which is comprised of a body 112, which has an opening 114 for a camera 102. On the case can be disposed a movable lens cover 216, which may have one or more openings 218 for the devices sensors 108. In one embodiment, the movable lens cover 216 has openings for the camera 102, the flash, the speaker 122, and the sensors 108 (FIGS. 10A-10E). When the movable lens cover 216 is in the closed position (FIG. 3), the camera 102 is completely covered, but the sensors 108 are not covered. When the movable lens cover 216 is in the open position (FIG. 1), the camera 102 is not obstructed, and the sensors 108 are not covered.

Figure 6A:
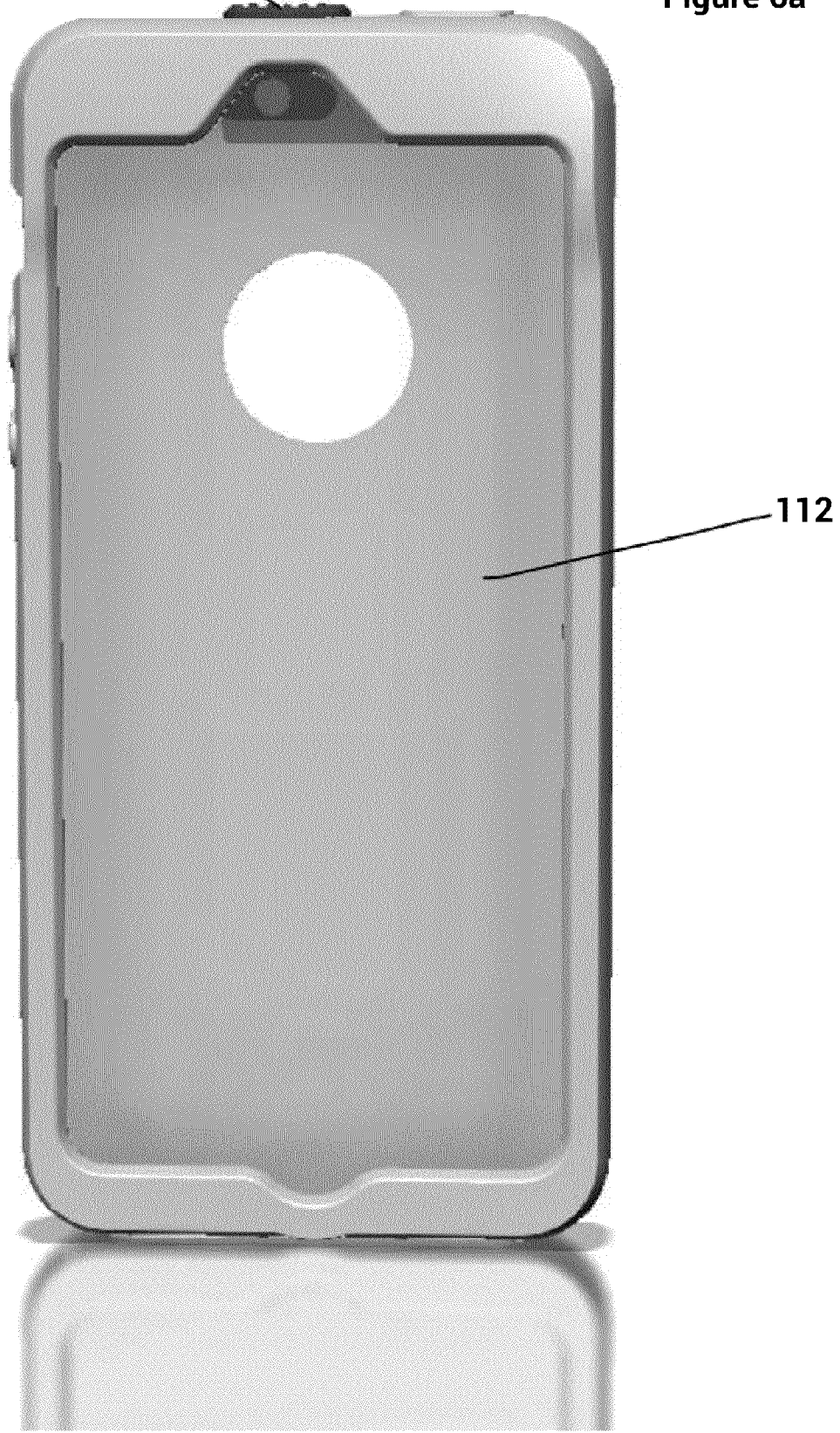
FIGS. 6A-6C illustrate a front, a rear left prospective and rear view, respectively, of an example of the case as a 2-piece unit. The exterior is a protective material, such as rubber, to provide protection to the device. The camera cover apparatus is comprised of a single unit that can cover two cameras (front and rear) when the user slides it into the "on" position.
Figure 6B:
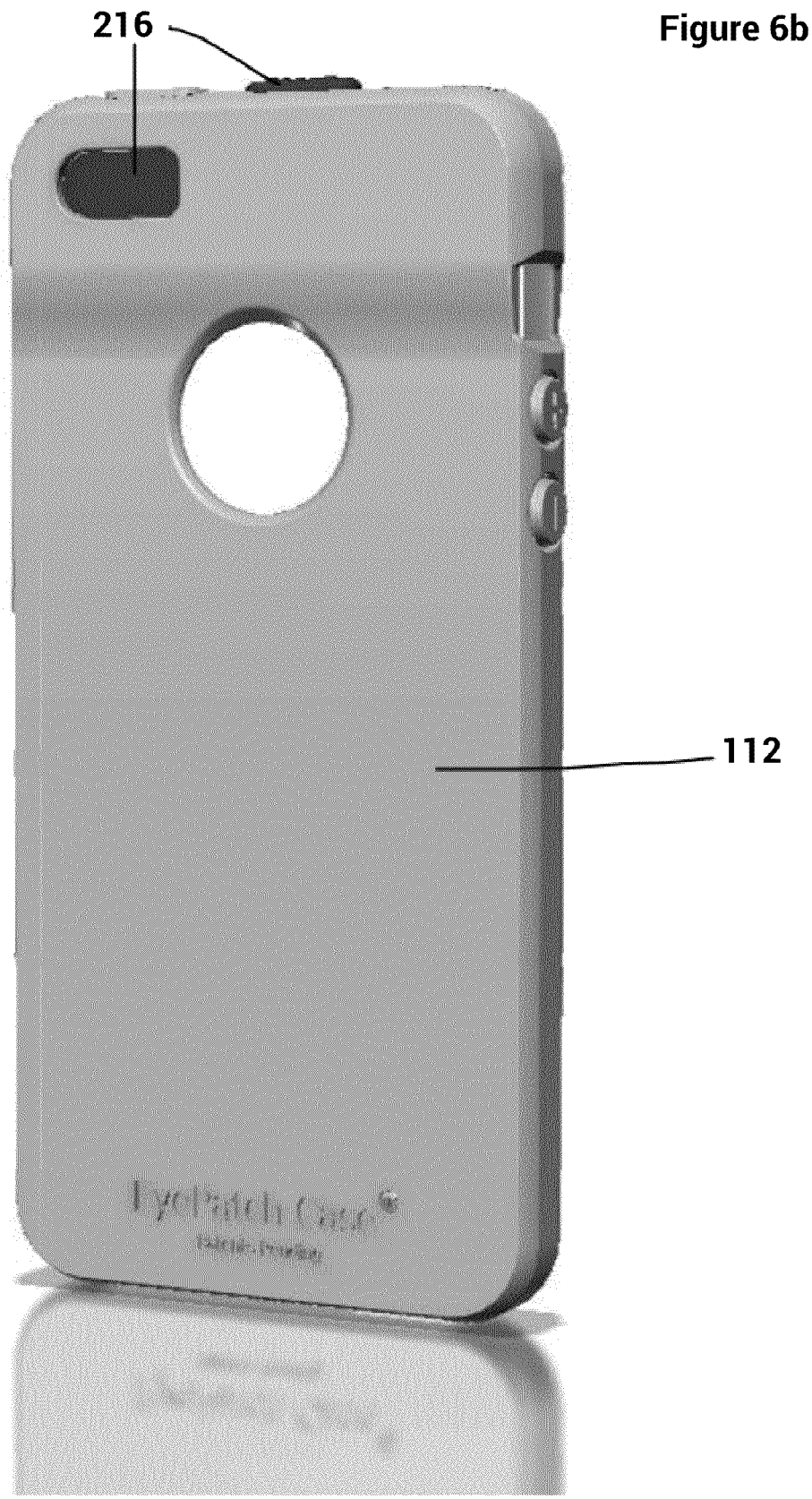
Figure 6C:
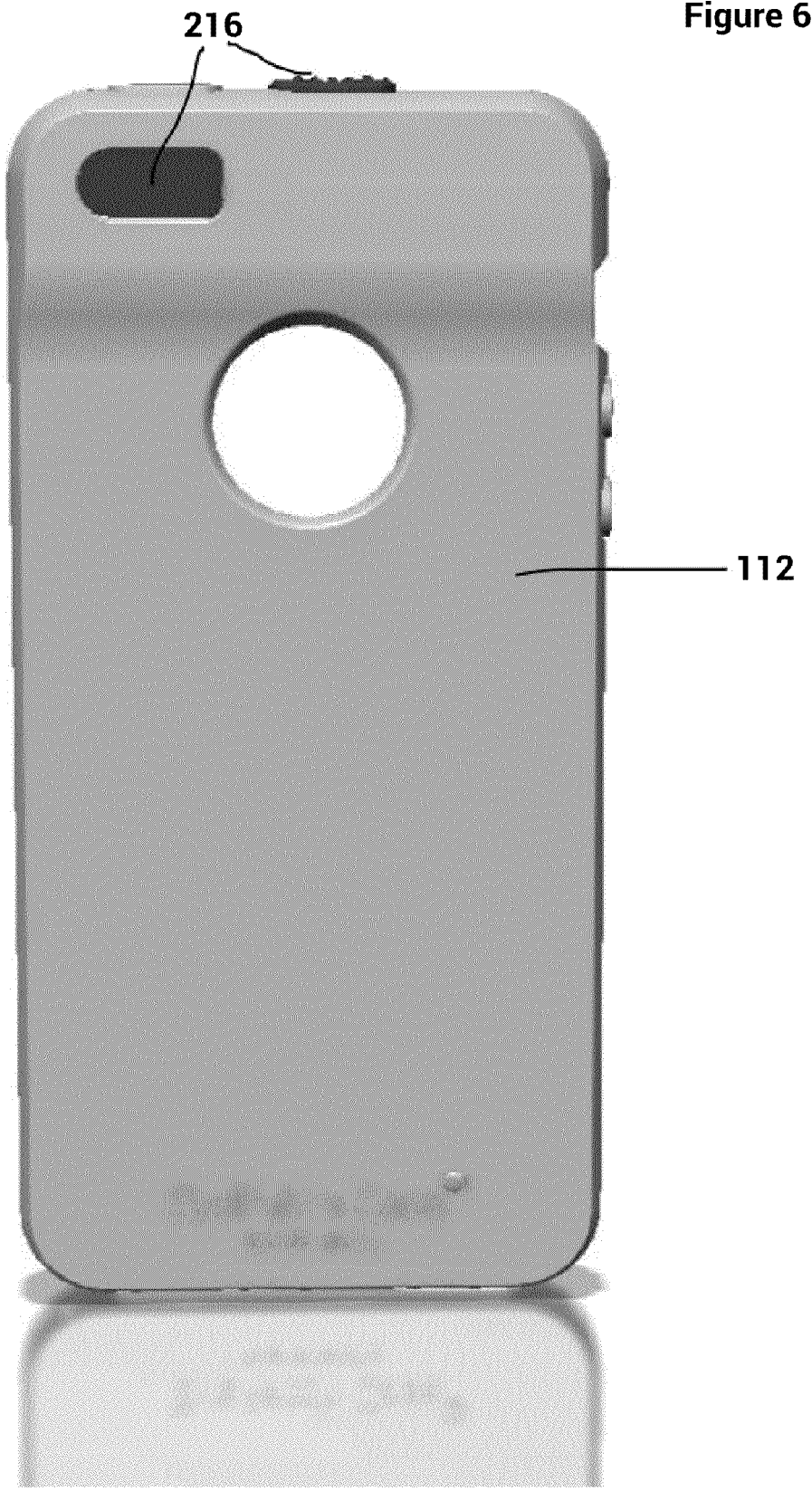
Figure 9B:
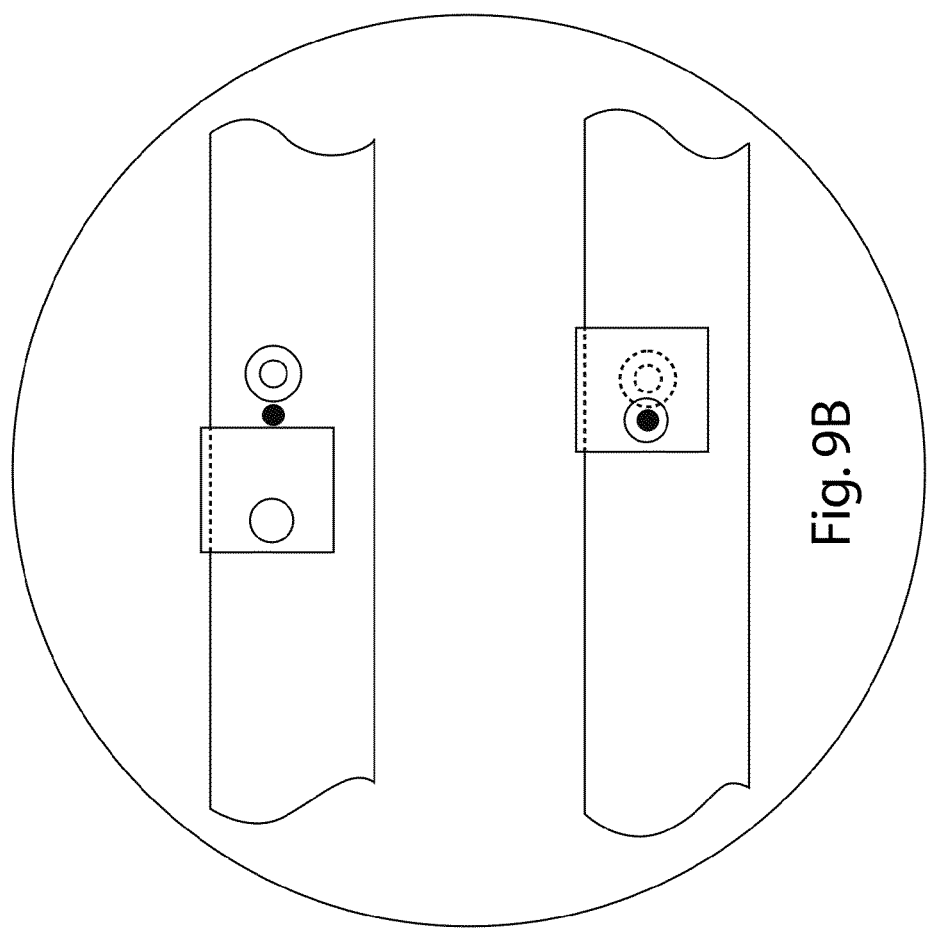
FIGS. 9A and 9B illustrate an example of the case for a laptop computer with a single camera. The camera cover occludes the devices camera while leaving the light sensor (located to the left of the camera in this case) exposed.
Figure 9A:
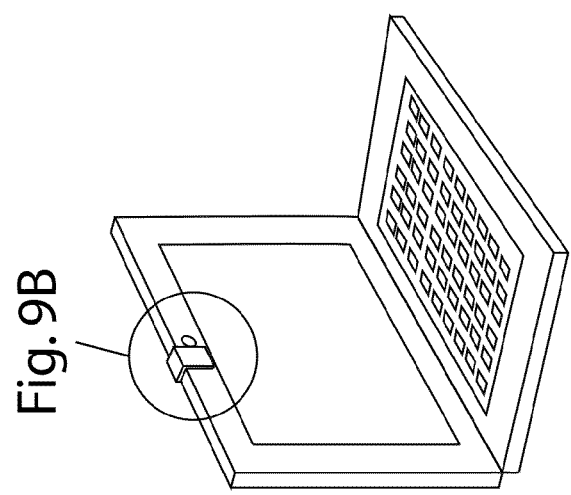
Figure 10A:
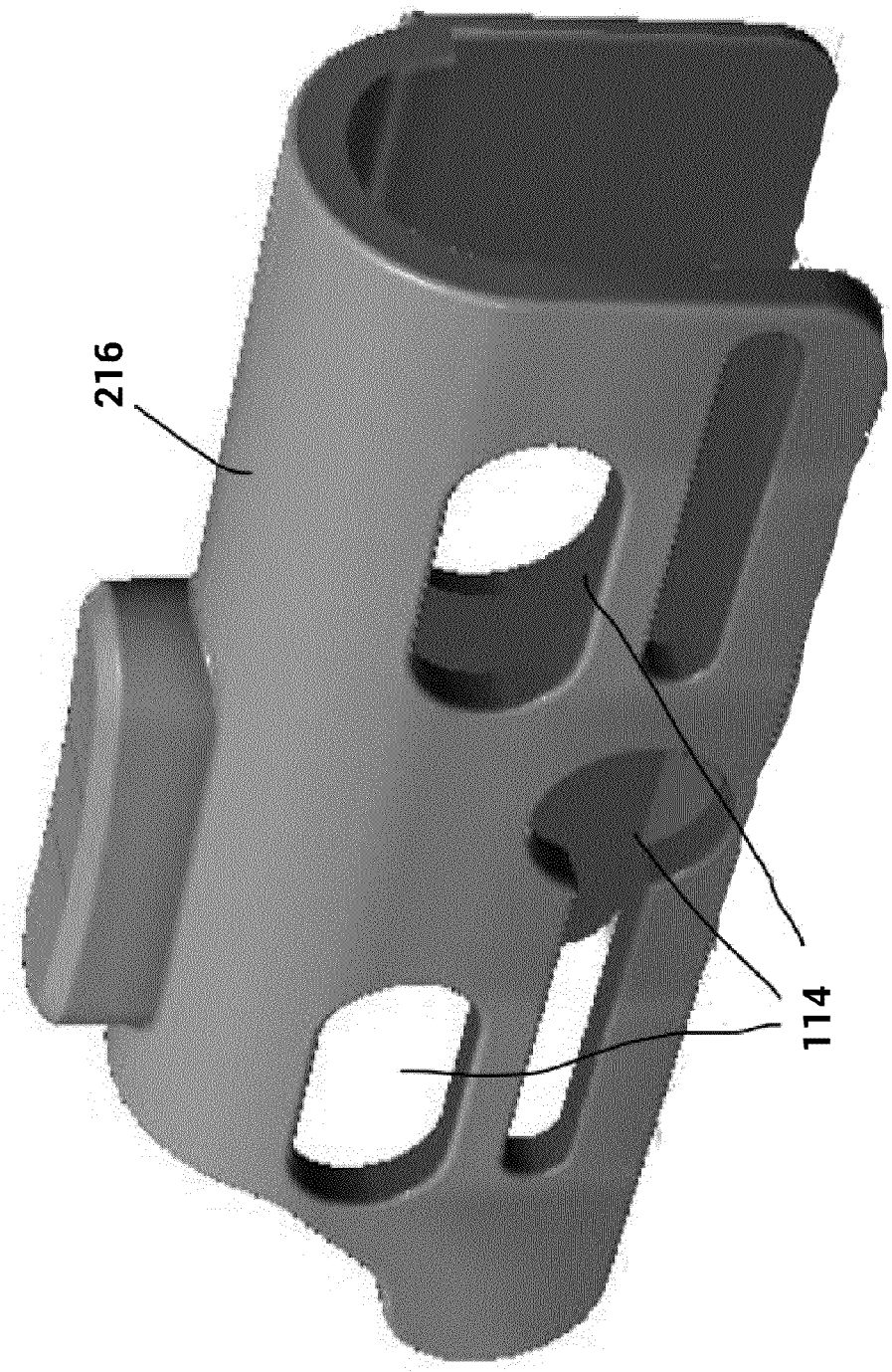
Figure 10D:
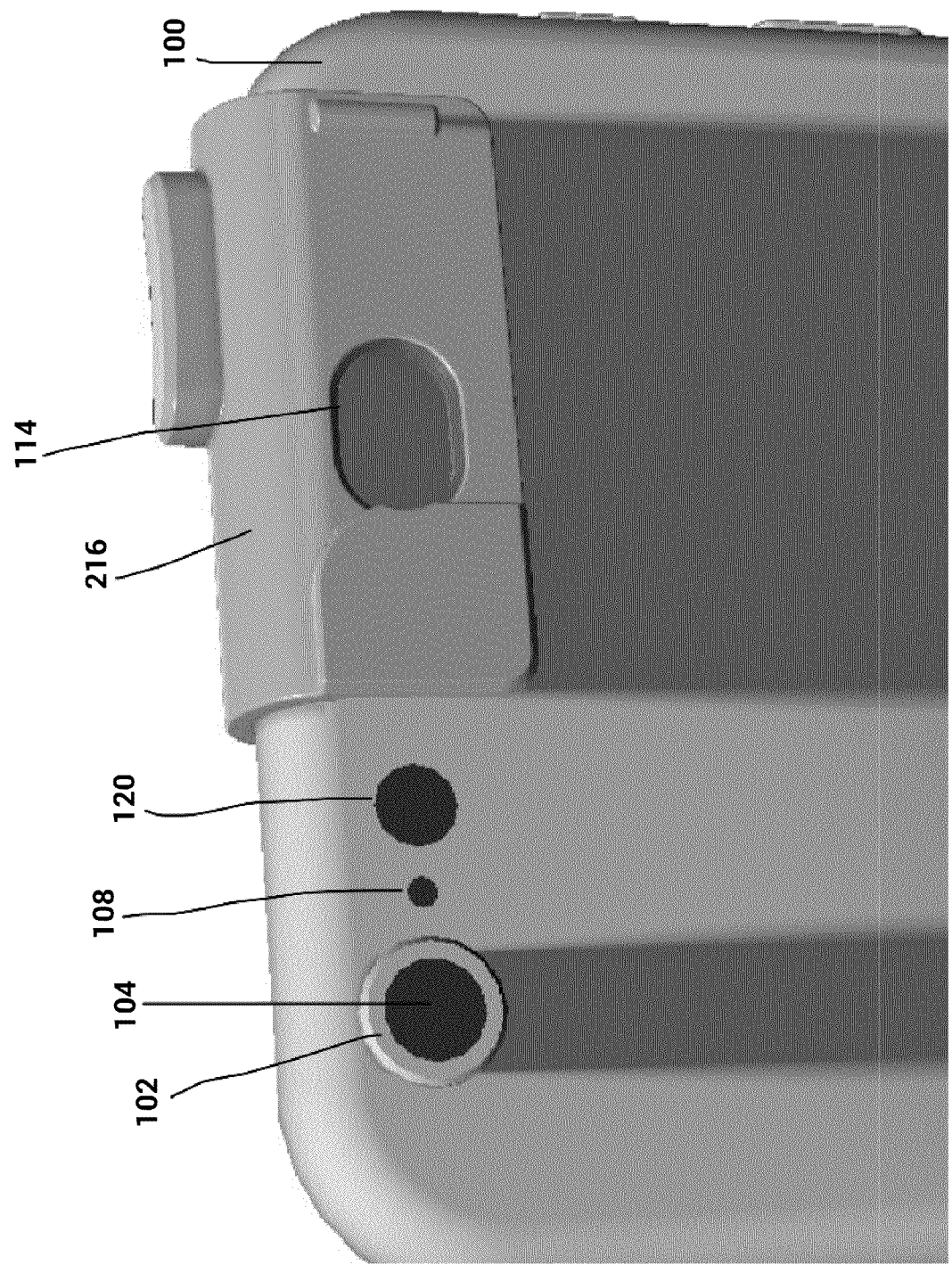

Some devices 100 have more than one camera 102. Examples of the present invention have the ability to occlude the lens 104 of some or all of those cameras 102 but not the surrounding sensors (FIGS. 6, 7, and 8). Examples of the present invention can cover one or more the mobile device 100 sensors 108, depending on the position of the movable lens cover 216 or leave them exposed. In the below example, there are 2 positions of the movable lens cover 216, but the invention can be modified to have multiple positions:

In position 1, the movable lens cover 216 does not occlude any sensors 108, cameras 102, or the flash 120. In position 2, the movable lens cover 216 occludes the front camera 102a but not the rear camera 102b and does not occlude the sensors 108 or the flash 120. In position 3, the movable lens cover 216 occludes the front 102a and rear cameras 102b but not the sensors 108 or the flash 120. In position 4, the movable lens cover 216 occludes the front 102a and rear cameras 102b, the flash 120, and not the sensors 108. In position 5, the movable lens cover 216 occludes all cameras 102 on the mobile device 100, the flash 120, and all sensors 108.

The movable lens cover 216 can be one or more pieces. For example, there may be an apparatus that covers the front camera 102a and the sensors 108 located on the front of the mobile device 100, and a second apparatus that covers the rear camera 102b, flash 120, and sensors 108 located on the back of the mobile device 100. Mobile devices are made in a variety of shapes and sizes, this invention can be modified to work on any mobile device 100 by altering the shape and size of the parts.

The movable lens cover 216 may have an interior lined with a material, such as fabric, which wipes the lens clean of debris, fingerprints, or smudges (FIG. 4). This material can be molded into the movable lens cover 216, or it may be a separate piece which is adheres to the movable lens cover 216, allowing the user to replace it.

The movable lens cover 216 may be fitted with an apparatus 218 that wipes the lens clean of debris, fingerprints, smudges, or liquid. This apparatus 218 can be made of (but is not limited to) material such as rubber and operates similar to a car's windshield-wiper (FIG. 5). The cleaning apparatus 218 can be molded into the movable lens cover 216, or it may be a separate piece which locks onto the movable lens cover 216, allowing the user to replace it.

The movable lens cover 216 may be fitted with additional lenses 220. For example, these lenses 220 can be, but are not limited to, telephoto, wide-angle, or macro. The additional lenses 220 work in conjunction with the mobile devices 100 existing camera 102 and lens 104. This allows the user to get more functionality from the camera 102 on their mobile device 100.

If the movable lens cover 216 is fitted with additional lenses 220, the user may choose to use the additional lens 220 or not. This is done by placing the lens in an area on the movable lens cover 216 that allows the user to choose which setting they want to use based on the position of the cover. For example, in one example of the invention:

In position 1, the movable lens cover 216 does not occlude any sensors 108, cameras 102, or the flash 120. In position 2 an additional lens 220 lines up with the rear camera 102b. The movable lens cover 216 does not occlude any sensors 108 or the flash 120. In position 3, the movable lens cover 216 occludes the front 102a and rear cameras 102b, but not the flash 120, and not the sensors 108.

The descriptions contained herein are examples of embodiments of the invention and are not intended in any way to limit the scope of the invention. As described herein, the invention contemplates many variations and modifications of the inventive device camera cover having numerous configurations, and can be constructed of numerous materials. Also, there are many possible variations in the materials and configurations for occluding the camera lens yet still exposing the remaining sensors. These modifications would be apparent to those having ordinary skill in the art to which this invention relates and are intended to be within the scope of the claims which follow.

What is claimed is:

1. A protective case for a mobile device having a front face, a rear face, a top edge, a bottom edge, two side edges, a first camera lens, and at least one sensor receiving an input, the protective case comprising:
    a body removably disposed on the mobile device and covering at least a portion of at least one of the front face, the rear face, the top, bottom and two side edges of the mobile device;
    a movable lens cover disposed on the body proximate to the first camera lens, comprising:
        a first lens occlusion section; and
        a first sensor access section;
    wherein the movable lens cover has at least two positions in relation to the mobile device,
    wherein a fully exposed position exposes both the first camera lens and the at least one sensor, and
    wherein a first partially occluded position disposes the first lens occlusion section over the first camera lens preventing light from reaching the first camera lens and disposes the first sensor access section over the at least one sensor allowing the at least one sensor to receive the input.

2. The protective case of claim 1, wherein the mobile device further has a second camera lens and at least one second sensor proximate the second camera lens, the movable lens cover further comprising:
    a second lens occlusion section; and
    a second sensor access section,
    wherein the fully exposed position further exposes the second camera lens and the at least one second sensor, and wherein the first partially occluded position further disposes the second lens occlusion section over the second camera lens preventing light from reaching the second camera lens and disposes the second sensor access section over the at least one second sensor allowing the sensor to receive inputs.

3. The protective case of claim 1, wherein the mobile device further has a second camera lens and at least one second sensor proximate the second camera lens, the movable lens cover further comprising:
a second lens occlusion section; and
a second sensor access section,
wherein the fully exposed position further exposes the second camera lens and the at least one second sensor, and
wherein the movable lens cover has a second partially occluded position disposing the second lens occlusion section over the second camera lens preventing light from reaching the second camera lens and disposing the second sensor access section over the at least one second sensor allowing the sensor to receive inputs, and
wherein the second partially occluded position exposes both the first camera lens and the at least one sensor.

4. The protective case of claim 3, wherein the movable lens cover has a third partially occluded position, fully occluding the first and second camera lens, and exposing the at least one sensor and the at least one second sensor by disposing the first lens occlusion section over the first camera lens preventing light from reaching the first camera lens and the second lens occlusion section over the second camera lens preventing light from reaching the second camera lens, and disposing the first sensor access section over the at least one sensor allowing the sensor to receive inputs and the second sensor access section over the at least one second sensor allowing the least one second sensor to receive inputs.

5. The protective case of claim 2, wherein the movable lens cover has a fully occluded position, fully occluding the first camera lens, the second camera lens, the at least one sensor and the at least one second sensor.

6. The protective case of claim 3, wherein the movable lens cover has a fully occluded position, fully occluding the first camera lens, the second camera lens, the at least one sensor and the at least one second sensor.

7. The protective case of claim 1, further comprising a camera-exposing cutout provided at an edge of the body exposing at least the first camera lens of the mobile device,
wherein the first partially occluded position disposes the movable lens cover over at least a portion of the camera-exposing cutout.

8. The protective case of claim 2, further comprising:
a first camera-exposing cutout provided at an edge of the body exposing at least the first camera lens of the mobile device; and
a second camera-exposing cutout provided at an edge of the body exposing at least the second camera lens of the mobile device,
wherein the first partially occluded position disposes the movable lens cover over at least a portion of the first and the second camera-exposing cutouts.

9. The protective case of claim 3, further comprising:
a first camera-exposing cutout provided at an edge of the body exposing at least the first camera lens of the mobile device; and
a second camera-exposing cutout provided at an edge of the body exposing at least the second camera lens of the mobile device,
wherein the first partially occluded position disposes the movable lens cover over at least a portion of the first and the second camera-exposing cutouts.

10. The protective case of claim 1, wherein the movable lens cover further comprises a first lens cleaner disposed on the first lens occlusion section wiping the first camera lens when the first lens occlusion section is disposed over the first camera lens.

11. The protective case of claim 2, wherein the movable lens cover further comprises a second lens cleaner disposed on the second lens occlusion section wiping the second camera lens when the second lens occlusion section is disposed over the second camera lens.

12. The protective case of claim 2, wherein the movable lens cover further comprises:
a first lens cleaner disposed on the first lens occlusion section wiping the first camera lens when the first lens occlusion section is disposed over the first camera lens; and
a second lens cleaner disposed on the second lens occlusion section wiping the second camera lens when the second lens occlusion section is disposed over the second camera lens.

13. The protective case of claim 3, wherein the movable lens cover further comprises a second lens cleaner disposed on the second lens occlusion section wiping the second camera lens when the second lens occlusion section is disposed over the second camera lens.

14. The protective case of claim 4, wherein the movable lens cover further comprises:
a first lens cleaner disposed on the first lens occlusion section wiping the first camera lens when the first lens occlusion section is disposed over the first camera lens; and
a second lens cleaner disposed on the second lens occlusion section wiping the second camera lens when the second lens occlusion section is disposed over the second camera lens.

15. A movable lens cover for a mobile device having a body, a first camera lens, and at least one sensor receiving an input, the movable lens cover comprising:
a movable lens cover disposing section to movably and removably dispose the movable lens cover on the body proximate to the first camera lens;
a first lens occlusion section; and
a first sensor access section;
wherein the movable lens cover has at least two positions in relation to the mobile device, wherein a fully exposed position exposes both the first camera lens and the at least one sensor, and
wherein a first partially occluded position disposes the first lens occlusion section over the first camera lens preventing light from reaching the first camera lens and disposes the first sensor access section over the at least one sensor allowing the at least one sensor to receive the input.

16. The movable lens cover of claim 15, wherein the movable lens cover has a fully occluded position, fully occluding the first camera lens, and the at least one sensor.

17. The movable lens cover of claim 15, further comprising a first lens cleaner disposed on the first lens occlusion section wiping the first camera lens when the first lens occlusion section is disposed over the first camera lens.

* * * * *